United States Patent
Yamagiwa et al.

(10) Patent No.: US 11,505,135 B2
(45) Date of Patent: Nov. 22, 2022

(54) VEHICLE INTERIOR STRUCTURE

(71) Applicant: MAZDA MOTOR CORPORATION, Hiroshima (JP)

(72) Inventors: Tsuyoshi Yamagiwa, Hiroshima (JP); Hiroyuki Matsuda, Hiroshima (JP); Katsunori Monden, Hiroshima (JP); Hiroshi Nagai, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 169 days.

(21) Appl. No.: 16/976,050

(22) PCT Filed: Feb. 21, 2019

(86) PCT No.: PCT/JP2019/006636
§ 371 (c)(1),
(2) Date: Aug. 26, 2020

(87) PCT Pub. No.: WO2019/167807
PCT Pub. Date: Sep. 6, 2019

(65) Prior Publication Data
US 2020/0398902 A1  Dec. 24, 2020

(30) Foreign Application Priority Data
Mar. 1, 2018 (JP) .............................. JP2018-036438

(51) Int. Cl.
*B62D 25/06* (2006.01)
*B60R 13/02* (2006.01)
*B60R 21/04* (2006.01)

(52) U.S. Cl.
CPC .......... *B60R 13/0212* (2013.01); *B60R 21/04* (2013.01); *B62D 25/06* (2013.01); *B60R 13/0206* (2013.01); *B60R 21/0428* (2013.01); *B60R 2021/0414* (2013.01); *B60R 2021/0435* (2013.01); *B60R 2021/0442* (2013.01)

(58) Field of Classification Search
CPC ............ B62D 25/06; B60R 2021/0442; B60R 2021/0414; B60R 13/0212
USPC ....................................... 296/187.05
See application file for complete search history.

(56) References Cited

U.S. PATENT DOCUMENTS 7,404,593 B2 * 7/2008 Cormier .................... B32B 3/28
   293/133
7,625,023 B2 * 12/2009 Audi ........................ B60N 2/70
   293/134

(Continued)

FOREIGN PATENT DOCUMENTS

| JP | 2002-225658 A | 8/2002 |
| JP | 2006-306257 A | 11/2006 |
| JP | 2009-196629 A | 9/2009 |

OTHER PUBLICATIONS

International Search Report issued in PCT/JP2019/006636; dated Apr. 16, 2019.

*Primary Examiner* — Jason S Morrow
(74) *Attorney, Agent, or Firm* — Studebaker & Brackett PC

(57) ABSTRACT

An impact absorbing member is disposed between a roof panel and a top ceiling disposed below the roof panel. The impact absorbing member includes a base plate portion and a hollow, cone-shaped portion extending upward from the base plate portion. The cone-shaped portion has a fragile portion that facilitates vertical crush and deformation.

6 Claims, 6 Drawing Sheets

(56) References Cited

U.S. PATENT DOCUMENTS

| | | | | |
|---|---|---|---|---|
| 7,758,107 | B2* | 7/2010 | Ratsos | B62D 25/06 |
| | | | | 296/187.05 |
| 8,056,962 | B2* | 11/2011 | Tauchi | B60R 21/04 |
| | | | | 296/187.05 |
| 8,201,671 | B2* | 6/2012 | Cho | B60R 21/0428 |
| | | | | 296/187.05 |
| 8,641,137 | B2* | 2/2014 | Lizak | B60R 13/0206 |
| | | | | 296/214 |
| 11,130,392 | B2* | 9/2021 | Williams | B60J 5/0451 |
| 2010/0253114 | A1 | 10/2010 | Ohmiya et al. | |
| 2015/0307049 | A1* | 10/2015 | Kwon | B60R 21/04 |
| | | | | 188/377 |

* cited by examiner

VEHICLE INTERIOR STRUCTURE

TECHNICAL FIELD

The present disclosure relates to a vehicle interior structure.

BACKGROUND ART

Vehicles are provided with an impact absorbing member disposed between a roof panel and a top ceiling disposed below the roof panel to allow the impact absorbing member to absorb a load from the roof panel at, e.g., rollover of the vehicles. Patent Document 1 discloses an impact absorbing member with a lattice-shaped rib structure.

CITATION LIST

Patent Document

Patent Document 1: Japanese Unexamined Patent Publication No. 2002-225658

SUMMARY OF THE INVENTION

Technical Problem

Meanwhile, there are some vehicles, such as a sports car, in which the height of a roof panel is low, and thus, a vertical interval between the roof panel and the top ceiling is extremely decreased. In this case, an impact absorbing member disposed between the roof panel and the top ceiling is required to absorb a heavy load by a small amount of vertical displacement in the member. Note that a lattice-shaped rib structure with a small vertical dimension has difficulty in sufficiently absorbing an impact.

The present disclosure is made in consideration of the above circumstances, and it is an object of the present disclosure to provide a vehicle interior structure including an impact absorbing member disposed between a roof panel and a top ceiling to allow the impact absorbing member to absorb a heavy load by even a small amount of vertical displacement.

Solution to the Problems

To solve the problem, the present disclosure proposes the following solution. Specifically, a first aspect of the disclosure relates to a vehicle interior structure including an impact absorbing member disposed between a roof panel and a top ceiling disposed below the roof panel, the impact absorbing member including a base plate portion and a hollow, cone-shaped portion extending upward from the base plate portion, the cone-shaped portion having a fragile portion that facilitates vertical crush and deformation.

According to the above solution, vertical crush and deformation of the cone-shaped portion absorb a load, and thus, even use of a small amount of vertical displacement can absorb a heavy load. In addition, forming the fragile portion is preferable for allowing crush and deformation of the cone-shaped portion as desired to reliably and effectively absorb an impact.

Preferred embodiments on the premise of the above solution are as described below. Specifically, the fragile portion is configured as a vertically extending opening formed in a side surface of the cone-shaped portion (a second aspect). In this case, a specific structure of the fragile portion is provided. In particular, configuring the fragile portion as an opening makes it possible to simply and reliably form the fragile portion, and further, setting the size of the opening makes it possible to easily obtain desired load-deformation characteristics of the cone-shaped portion.

A lower end of the opening reaches the base plate portion (a third aspect). This case is preferable for sufficiently crushing and deforming the cone-shaped portion to allow the cone-shaped portion to sufficiently absorb a load.

The opening includes a plurality of openings formed along a circumference of the cone-shaped portion at equal intervals (a fourth aspect). This case is preferable for substantially uniformly crushing and deforming the cone-shaped portion along its circumference.

The plurality of openings include two openings formed along the circumference of the cone-shaped portion at 180-degree intervals (a fifth aspect). This case makes it possible to crush and deform the cone-shaped portion to allow the cone-shaped portion to spread in a direction perpendicular to a line connecting two openings together.

A reinforcement is disposed directly under the roof panel and extends in a vehicle width direction, and the cone-shaped portion is disposed between the reinforcement and the top ceiling (a sixth aspect). In this case, a heavy load tends to be applied from the reinforcement. However, the cone-shaped portion can effectively absorb such a load from the reinforcement. Further, the vertical interval between the reinforcement and the top ceiling is extremely small, but the cone-shaped portion can absorb a heavy load within such a small vertical interval range.

The base plate portion includes a rib for impact absorption at a position displaced from the reinforcement in a longitudinal direction (a seventh aspect). In this case, the impact can be absorbed by the rib, too.

The cone-shaped portion includes a plurality of cone-shaped portions disposed between the reinforcement and the top ceiling and spaced apart from each other in a longitudinal direction (an eighth aspect). In this case, the plurality of cone-shaped portions can more effectively absorb an impact.

The reinforcement has a cross-section such that a projection projecting upward is continuous with a recess recessed downward in a longitudinal direction, and the cone-shaped portion is disposed in the projection projecting upward (a ninth aspect). In this case, it is possible to dispose the cone-shaped portion in the space between the reinforcement and the top ceiling at a position where the vertical interval is larger.

The fragile portion is configured as a vertically extending opening formed in a side surface of the cone-shaped portion, the opening includes two openings formed along the circumference of the cone-shaped portion at 180-degree intervals, and the cone-shaped portion disposed in the projection is formed such that the two openings are spaced apart from each other in a longitudinal direction (a tenth aspect). In this case, the cone-shaped portions, which are to be crushed and deformed so as to spread in the vehicle width direction relative to a longitudinally extending line connecting the two openings together, can be smoothly crushed and deformed without interference of a vertical wall of the reinforcement. This is preferable for allowing the cone-shaped portions to effectively absorb a load.

The cone-shaped portion has a flat upper surface (an eleventh aspect). This case, with the flat surface defined as a region to which a load from the roof panel to the cone-shaped portion is applied, is preferable for effectively transferring the load from the roof panel to the cone-shaped portion.

The impact absorbing member is disposed in the roof panel in a longitudinal direction at a region corresponding to a B-pillar (a twelfth aspect). In this case, the region corresponding to a B-pillar in the roof panel in a longitudinal direction is high in rigidity and is high in effectiveness of a load transfer from the roof panel. Therefore, disposing the cone-shaped portion at such a region is preferable for allowing the cone-shaped portion to effectively absorb an impact.

The impact absorbing member including the base plate portion and the cone-shaped portion is a one-piece molding of synthetic resin (a thirteenth aspect). This case is preferable for simply forming the impact absorbing member with a lighter weight. In addition, even if the head of an occupant who has stood up inside the vehicle is abut against the impact absorbing member through the top ceiling, this case is also preferable for alleviating the impact to the head.

Advantages of the Invention

According to the present disclosure, an impact absorbing member disposed between a roof panel and a top ceiling can absorb a heavy load by even a small amount of vertical displacement.

DESCRIPTION OF EMBODIMENTS

Figure 1:
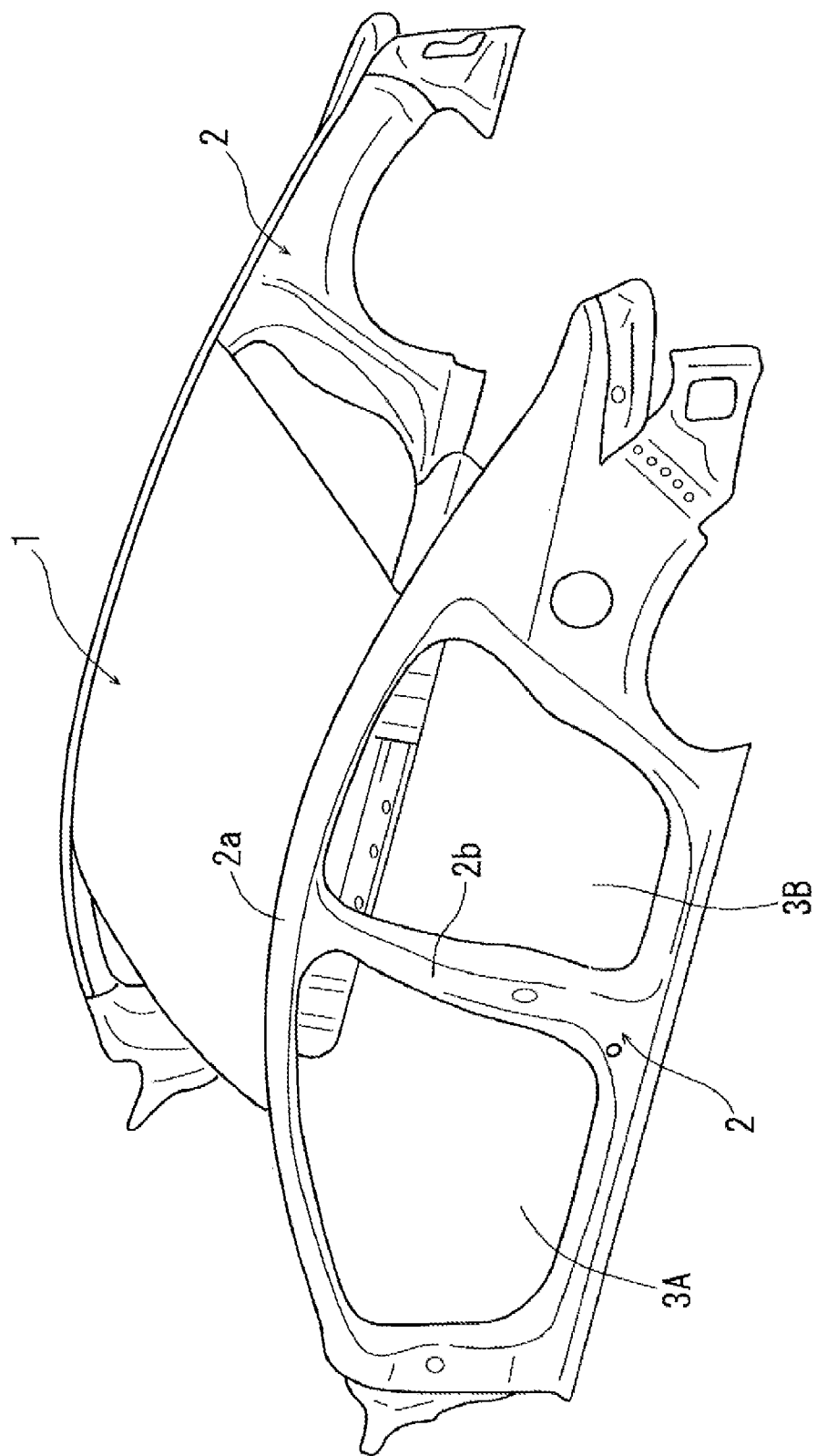
FIG. 1 is a perspective view of an exemplary vehicle body structure of a roof panel and its vicinity of a vehicle to which the present disclosure is applied.

In FIG. 1, reference character 1 denotes a roof panel and reference character 2 denotes a side panel. The side panel 2 is frame-shaped with a front-rear pair of openings 3A and 3B for doors. Of the side panel 2, a portion continuous with the roof panel 1 is a roof side rail 2a, and a portion extending downward from an intermediate position of the roof side rail 2a in a longitudinal direction is a B-pillar 2b.

Figure 2:
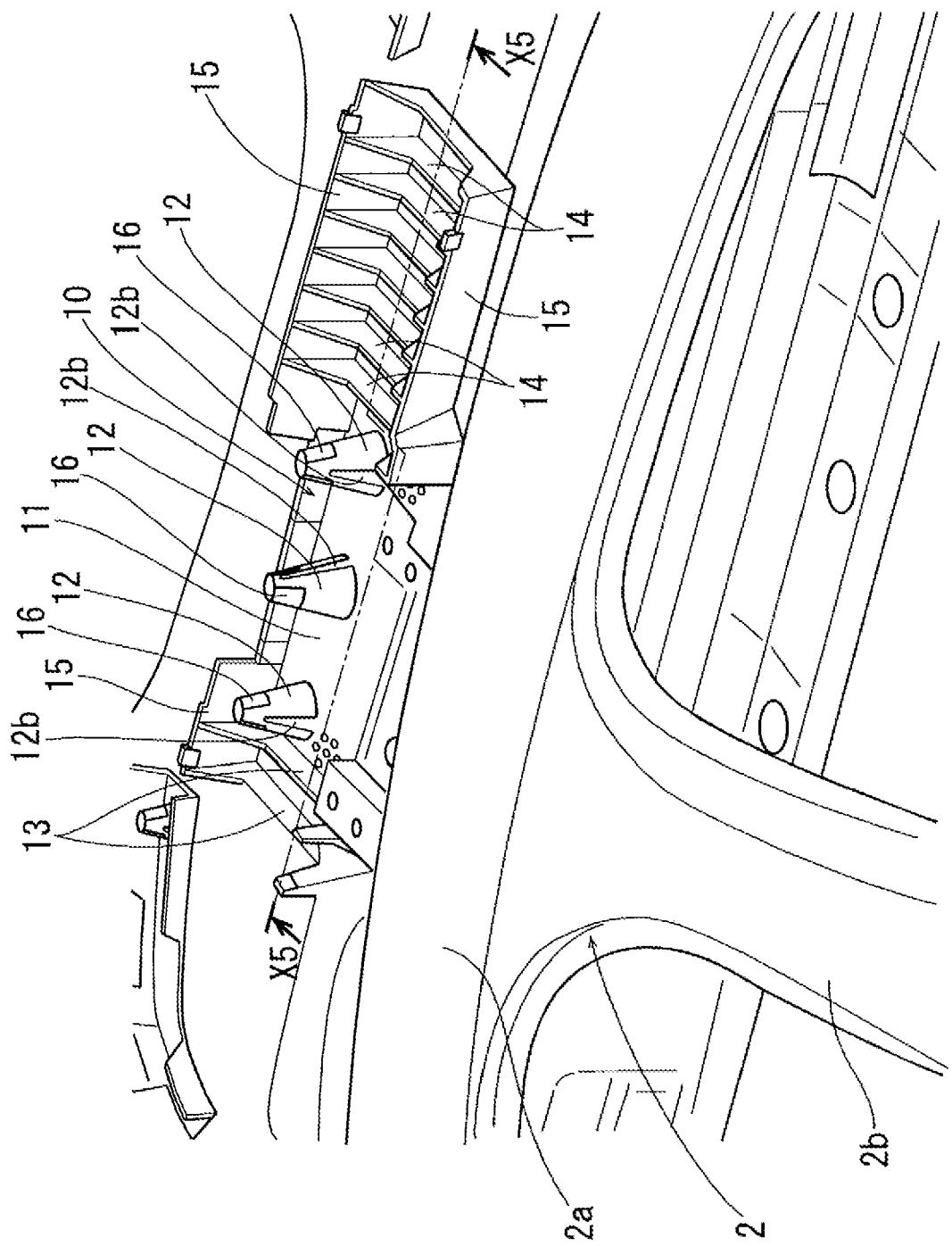
FIG. 2 is a perspective view of the main part of FIG. 1 with the roof panel removed.
Figure 3:
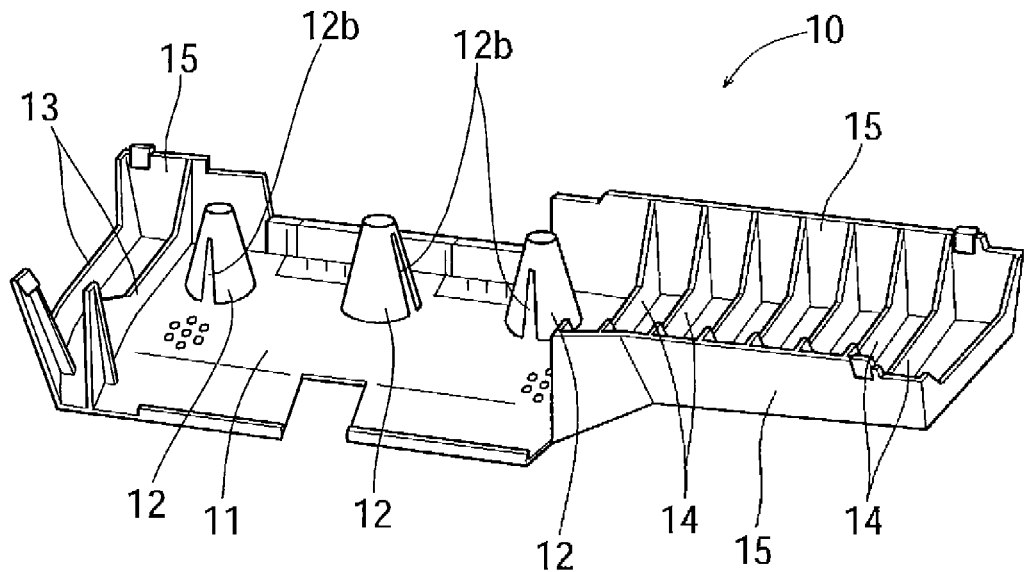
FIG. 3 is a perspective view of an impact absorbing member.
Figure 4:
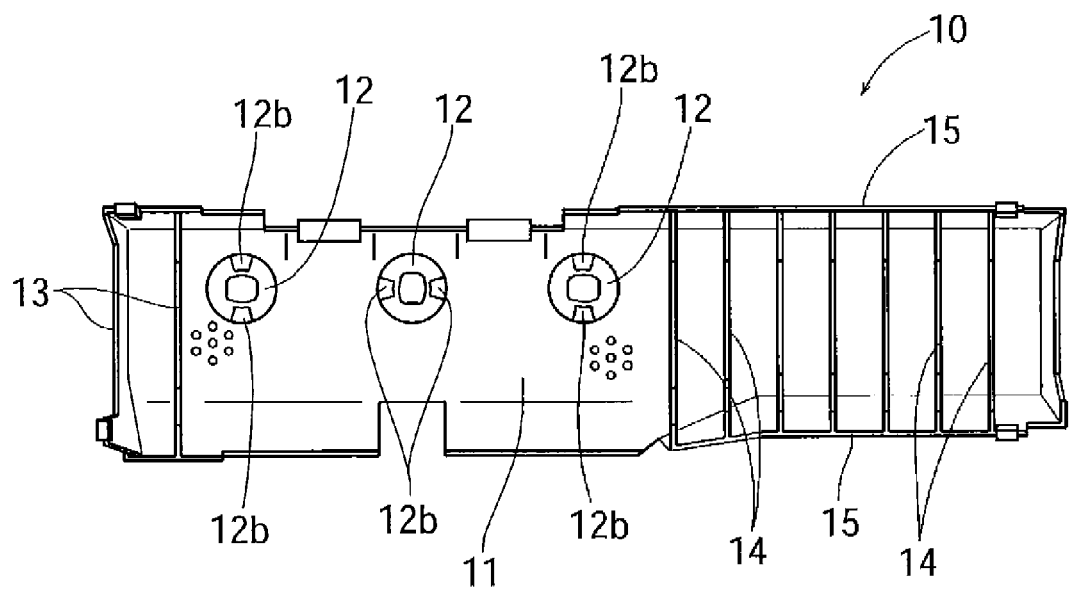
FIG. 4 is a plan view of the impact absorbing member when viewed from above.
Figure 5:
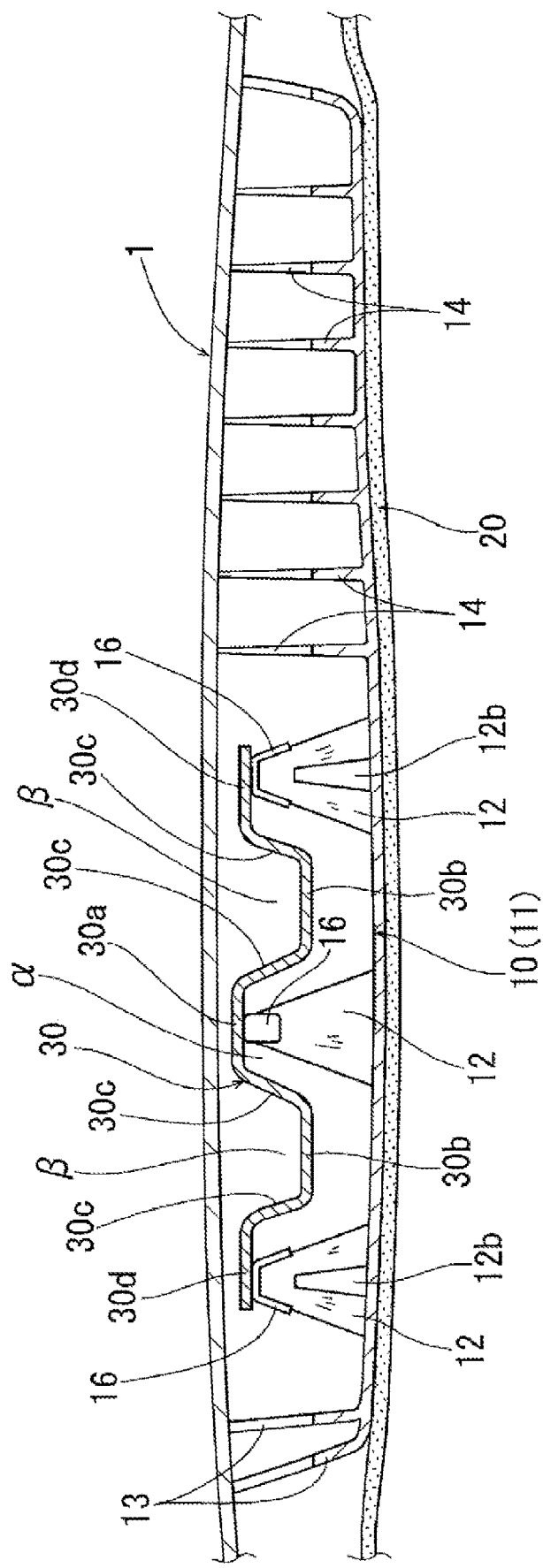
FIG. 5 is a cross-sectional view taken along line X5-X5 in FIG. 2.

As illustrated in FIGS. 2 and 5, an impact absorbing member 10 is disposed directly under the roof panel 1. More specifically, the position where the impact absorbing member 10 is disposed relative to the roof panel 1 corresponds to the position of the B-pillar 2b in the longitudinal direction, and is immediately adjacent to the B-pillar 2b in a vehicle width direction. The overall shape of the impact absorbing member 10 is illustrated in FIGS. 3 and 4. The impact absorbing member 10 is a one-piece molding of synthetic resin.

The impact absorbing member 10 has a base plate portion 11 that is long in the longitudinal direction. From the base plate portion 11, a plurality of cone-shaped portions 12, a plurality of front ribs 13, and a plurality of rear ribs 14 each extend upward. The plurality of cone-shaped portions 12 (three in the embodiment) are spaced apart from each other in the longitudinal direction.

The front ribs 13 extend in the vehicle width direction, and are formed in front of the cone-shaped portions 12. The rear ribs 14 extend in the vehicle width direction, and are formed behind the cone-shaped portions 12. The plurality of front ribs 13 are formed to be spaced apart from each other in the longitudinal direction. The plurality of rear ribs 14 are formed to be spaced apart from each other in the longitudinal direction. The number of the rear ribs 14 is greater than that of the front ribs 13.

From the base plate portion 11, a left-right pair of vertical walls 15 (can be said to be ribs extending in the longitudinal direction) extends upward in a position associated with the rear ribs 14, the vertical walls 15 being spaced apart from each other in the vehicle width direction. The rear ribs 14 extend in the vehicle width direction to couple the left-right pair of vertical walls 15 together. The rear ribs 14 has an intermediate portion in the vehicle width direction ("a widthwise intermediate portion") and an end in the vehicle width direction ("a widthwise end") such that the widthwise intermediate portion is higher than the vertical wall 15 and the widthwise end is at almost the same height as the vertical wall 15. The front rib 13 has a similar configuration to the rear rib 14, but does not have the outward one of the left-right pair of vertical walls 15 in the vehicle width direction.

FIG. 5 illustrates how the impact absorbing member 10 is disposed relative to the roof panel 1. In the figure, reference character 20 denotes a top ceiling, and reference character 30 denotes a reinforcement. The top ceiling 20 substantially constitutes a ceiling wall of a vehicle interior and is made of a soft material. The reinforcement 30 has respective widthwise ends bonded to an associated one of the roof side rails 2a, and spaced apart from (the lower surface of) the roof panel 1.

As illustrated in FIG. 5, the reinforcement 30 has a cross-section such that a projection a projecting upward is continuous with a recess β recessed downward. Specifically, reference character 30a denotes a top wall, reference character 30b denotes a bottom wall, and reference character 30c denotes a vertical wall extending vertically and having ends which are one end of the top wall 30a and one end of the bottom wall 30b. In the embodiment, only one projection a is provided in the intermediate position in the longitudinal direction, and a front-rear pair of recesses β is provided so as to sandwich the projection a in the longitudinal direction.

The reinforcement 30 has ends in the longitudinal direction ("longitudinal ends"), each of which is a flange 30d positioned at substantially the same height as the top wall 30a. Each of the longitudinal ends of the reinforcement 30 is open frontward or rearward. That is to say, no vertical wall 30c is provided to each of the longitudinal ends of the reinforcement 30.

Figure 6:
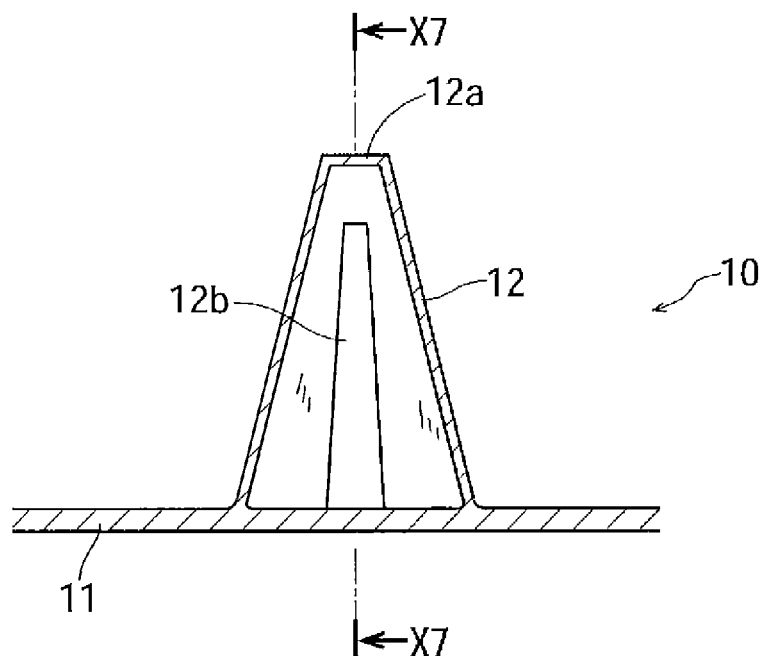
FIG. 6 is a cross-sectional view of a side surface of a cone-shaped portion.
Figure 7:
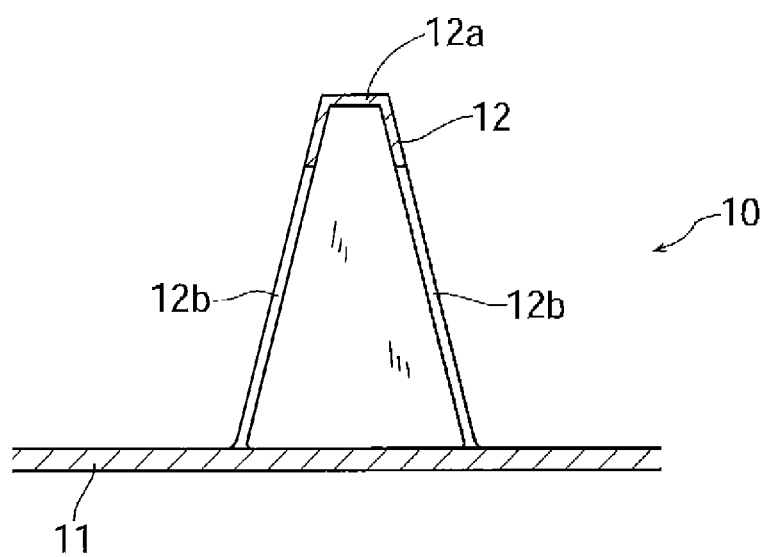
FIG. 7 is a cross-sectional view taken along line X7-X7 in FIG. 6.

FIGS. 6 and 7 illustrate the cone-shaped portion 12, specifically. The cone-shaped portion 12 is in the shape of a hollow cone (truncated cone) with a flat upper surface 12a. Further, the cone-shaped portion 12 has a side surface provided with two openings 12b formed along its circumference at 180-degree intervals. This opening 12b serves as a fragile portion, and the lower end thereof reaches the base plate portion 11. The upper end of the opening 12b, though not reaching the upper surface 12a, is adjacent to the upper surface 12a.

Three cone-shaped portions 12 are disposed between the reinforcement 30 and the top ceiling 20. Specifically, the middle cone-shaped portion 12 in the longitudinal direction is disposed under the projection a of the reinforcement 30, and the rest cone-shaped portions 12 adjacent to respective longitudinal ends are disposed under the flange 30d formed at respective longitudinal ends of the reinforcement 30.

Figure 8:
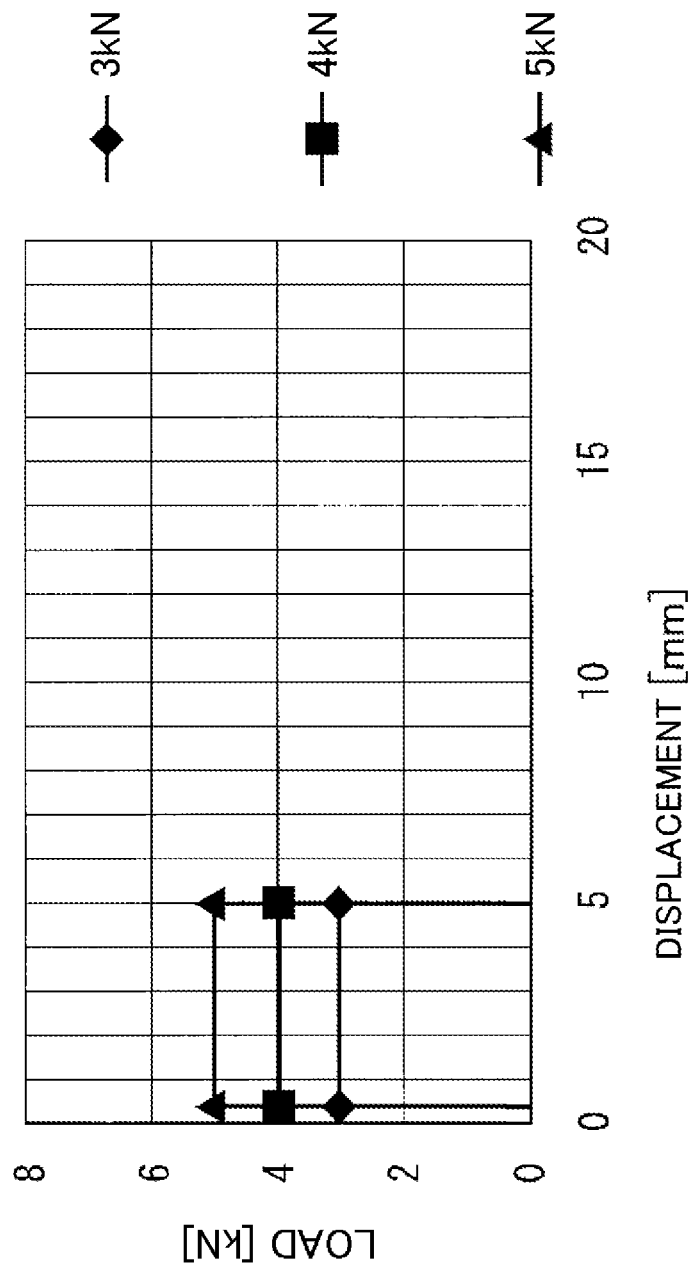
FIG. 8 is a diagram showing load-deformation characteristics of the cone-shaped portion.

FIG. 8 shows load-deformation characteristics of the respective cone-shaped portions 12. In FIG. 8, the vertical axis of represents an axial load to be absorbed by the cone-shaped portion 12, and the horizontal axis represents an axial deformation volume in applying each load relative to the initial state (a state where no load is applied) of the cone-shaped portion 12. As clearly shown in FIG. 8, use of a small amount of displacement in the cone-shaped portion 12 makes it possible to absorb a heavy load (even a small amount of vertical displacement enables absorption of the heavy load). Changing the thickness of the cone-shaped portions 12 and the length and width of the opening 12b enables achievement of desired load-deformation characteristics of the cone-shaped portions 12.

Here, the position of one pair of the openings 12b formed in the cone-shaped portion 12 differs between the cone-shaped portion 12 at the longitudinal intermediate position and the cone-shaped portions 12 at the longitudinal ends. Specifically, the two openings 12b of the cone-shaped portion 12 at the longitudinal intermediate position are provided so as to be spaced apart from each other in the longitudinal direction. In contrast, the two openings 12b of each of the cone-shaped portions 12 at the longitudinal ends are provided so as to be spaced apart from each other in the vehicle width direction.

The cone-shaped portion 12, when receiving a vertical load, is crushed and deformed so as to be divided at the two openings 12b (is crushed and deformed so as to spread in a direction perpendicular to a line connecting two openings 12b together). The cone-shaped portion 12 at the longitudinal intermediate position is crushed and deformed so as to spread in the vehicle width direction, and thus, the cone-shaped portion 12 can sufficiently be crushed and deformed without interference (interruption) of the front-rear pair of the vertical walls 30c of the reinforcement 30.

In contrast, the cone-shaped portions 12 at the longitudinal ends are crushed and deformed so as to spread in the longitudinal direction. In the cone-shaped portions 12 at the longitudinal ends, at least the frontward or rearward portion thereof is sufficiently open (that is, one longitudinal end is provided with no vertical wall 30c of the reinforcement 30), thereby reliably enabling crush and deformation to spread in the longitudinal direction.

The impact absorbing member 10 is fixed to the upper surface of the top ceiling 20 with, e.g., a hot-melt, a double-sided tape or an adhesive. Further, the upper surface 12a of the cone-shaped portion 12 and the vicinity thereof are covered with a cushioning material 16 (to prevent direct contact between the cone-shaped portion 12 and the reinforcement 30). It is to be noted that the cushioning material 16 is illustrated in FIG. 2, but is not illustrated in FIGS. 3 and 4.

In the above described configuration, it is assumed that, e.g., rollover of a vehicle causes deformation of the roof panel 1 toward the interior of the vehicle. At that time, the impact is absorbed by crush and deformation of the cone-shaped portion 12 and crush and deformation of the front and rear ribs 13 and 14. In particular, use of small deformation of the cone-shaped portion 12 can absorb a heavy load, and thus, even a small interval between the roof panel 1 and the top ceiling 20 enables effective absorption of the impact. On top of that, since the cone-shaped portions 12 are disposed between the reinforcement 30 and the top ceiling 20, the load from the roof panel 1 is effectively transferred to the cone-shaped portion 12 through the reinforcement 30, which is significantly preferable for effective impact absorption by the cone-shaped portions 12.

Although the embodiment of the present disclosure have been described, the present disclosure is in no way limited to the embodiment but may be changed, replaced or modified appropriately without departing from the true spirit and scope of the present disclosure as defined only by the appended claims. The impact absorbing member 10 including the cone-shaped portions 12 can be disposed in the roof panel 1 at a proper region that is required to absorb an impact (for example, at front and rear edges of the roof panel 1). The number of the cone-shaped portions 12 to be provided to the base plate portion is selectable as appropriate (one, two, or four or more cone-shaped portions 12 are provided). The opening 12b formed in the cone-shaped portions 12 and serving as a fragile portion can be set as appropriate. For example, three or more opening 12b can also be arranged along the circumference of the cone-shaped portion 12 at equal intervals, or the opening 12b can be extended along the circumference to provide the plurality of the openings 12b in the vertical direction. Further, the shape of the fragile portion formed in the cone-shaped portion 12 is not limited to the opening, and proper shapes such as a linear shape, or recess (thin portion) shape can be adopted. The cone-shaped portion 12 is in the shape of the cone with the flat upper surface. Alternatively, a polygon pyramid, such as a hexagonal pyramid or octagonal pyramid, with a flat upper surface can also be used. Naturally, objects of the present disclosure include not only the explicitly specified ones but also others that are implicitly suggested herein as advantages or benefits of the present disclosure.

INDUSTRIAL APPLICABILITY

The present disclosure effectively absorbs an impact of a load from a roof panel, and is preferable for safety guarantee.

DESCRIPTION OF REFERENCE CHARACTERS

1 Roof Panel
2 Side Panel
2a Roof Side Rail
2b B-pillar
10 Impact Absorbing Member
11 Base Plate Portion
12 Cone-shaped Portion
12a Upper Surface
12b Opening (Fragile Portion)
13 Front Rib
14 Rear Rib
15 Vertical Wall (Rib)
16 Cushioning Material
20 Top Ceiling
30 Reinforcement
30a Top Wall
30b Bottom Wall
30c Vertical Wall
30d Flange α Projection
β Recess

The invention claimed is:

1. A vehicle interior structure including an impact absorbing member disposed between a roof panel and a top ceiling disposed below the roof panel,
the impact absorbing member including a base plate portion and a hollow, cone-shaped portion extending upward from the base plate portion,
the cone-shaped portion having a fragile portion that facilitates vertical crush and deformation, wherein
the fragile portion is configured as a vertically extending opening formed in a side surface of the cone-shaped portion,
a lower end of the opening reaches the base plate portion,
the opening includes a plurality of openings formed along a circumference of the cone-shaped portion at equal intervals,
the plurality of openings include two openings formed along the circumference of the cone-shaped portion at 180-degree intervals,
a reinforcement is disposed directly under the roof panel and extends in a vehicle width direction,
the cone-shaped portion is disposed between the reinforcement and the top ceiling,
the base plate portion includes a rib for impact absorption at a position displaced from the reinforcement in a longitudinal direction,
the cone-shaped portion includes a plurality of cone-shaped portions disposed between the reinforcement and the top ceiling and spaced apart from each other in a longitudinal direction,
the reinforcement has a cross-section such that a projection projecting upward is continuous with a recess recessed downward in a longitudinal direction, and
the cone-shaped portion is disposed in the projection projecting upward.

2. The vehicle interior structure of claim 1, wherein the cone-shaped portion has a flat upper surface.

3. The vehicle interior structure of claim 1, wherein the impact absorbing member is disposed at a region corresponding to a B-pillar in a longitudinal direction of the roof panel.

4. The vehicle interior structure of claim 1, wherein the impact absorbing member including the base plate portion and the cone-shaped portion is a one-piece molding of synthetic resin.

5. The vehicle interior structure of claim 1, wherein the fragile portion is configured as a vertically extending opening formed in a side surface of the cone-shaped portion,
the opening includes two openings formed along the circumference of the cone-shaped portion at 180-degree intervals, and
the cone-shaped portion disposed in the projection is formed such that the two openings are spaced apart from each other in a longitudinal direction.

6. A vehicle interior structure including an impact absorbing member disposed between a roof panel and a top ceiling disposed below the roof panel,
the impact absorbing member including a base plate portion and a hollow, cone-shaped portion extending upward from the base plate portion,
the cone-shaped portion having a fragile portion that facilitates vertical crush and deformation, wherein
the reinforcement has a cross-section such that a projection projecting upward is continuous with a recess recessed downward in a longitudinal direction, and
the cone-shaped portion is disposed in the projection projecting upward.

* * * * *